United States Patent
Cohen et al.

(10) Patent No.: US 10,429,017 B2
(45) Date of Patent: Oct. 1, 2019

(54) ELECTRICAL COVER

(71) Applicants: Bradley Cohen, Evans, CO (US); Brian Neece, Windsor, CO (US)

(72) Inventors: Bradley Cohen, Evans, CO (US); Brian Neece, Windsor, CO (US)

(73) Assignee: 2BR Creations, LLC, Evans, CO (US)

( * ) Notice: Subject to any disclaimer, the term of this patent is extended or adjusted under 35 U.S.C. 154(b) by 0 days.

(21) Appl. No.: 15/587,381

(22) Filed: May 4, 2017

(65) Prior Publication Data

US 2017/0324232 A1  Nov. 9, 2017

Related U.S. Application Data

(60) Provisional application No. 62/331,962, filed on May 4, 2016.

(51) Int. Cl.
| | |
|---|---|
| F21S 8/02 | (2006.01) |
| H02G 3/08 | (2006.01) |
| H01R 13/447 | (2006.01) |
| H02G 3/14 | (2006.01) |
| H01H 21/08 | (2006.01) |
| B05B 12/24 | (2018.01) |
| B05B 12/20 | (2018.01) |
| B05B 12/26 | (2018.01) |
| H01H 29/08 | (2006.01) |
| H02G 3/02 | (2006.01) |

(Continued)

(52) U.S. Cl.
CPC .............. *F21S 8/02* (2013.01); *B05B 12/24* (2018.02); *B05B 12/26* (2018.02); *B05B 12/29* (2018.02); *F21S 8/026* (2013.01); *H01H 21/08* (2013.01); *H01H 29/08* (2013.01); *H01R 13/447* (2013.01); *H02G 3/088* (2013.01); *H02G 3/14* (2013.01); *F21V 17/002* (2013.01); *H01R 13/44* (2013.01); *H02G 3/02* (2013.01)

(58) Field of Classification Search
CPC ............ H02G 3/088; H02G 3/14; H02G 3/02; H02G 3/08; H01R 13/447; H01R 13/44; F21S 8/02
USPC ...................................................... 174/66, 67
See application file for complete search history.

(56) References Cited

U.S. PATENT DOCUMENTS 3,246,103 A * 4/1966 Bellek ..................... H01R 13/68
   174/67
4,302,624 A * 11/1981 Newman ............. H01R 13/447
   174/67

(Continued)

*Primary Examiner* — Dhiru R Patel
(74) *Attorney, Agent, or Firm* — Craig R. Miles; CR Miles P.C.

(57) ABSTRACT

The electrical cover is a flexible, friction-held electrical cover that guards outlets from finish materials such as paint, spackling, and other foreign materials. The frictionally-held finish material electrical covers utilize specifically shaped features on the surfaces, such as negative draft, that contact the electrical components to increase the hold on the electrical device. Some of the shaped features of the frictionally-held covers also help minimize stress in the cover. The electrical covers are shaped with an arched rear surface that assists in minimizing edge warping when the electrical cover is positioned against the wall surface. Features are also molded into the parts to assist and strengthen the cover flatness once installed, and thus protect against the intrusion of finish material behind the cover.

14 Claims, 6 Drawing Sheets

(51) Int. Cl.
  *H01R 13/44* (2006.01)
  *F21V 17/00* (2006.01)

(56) References Cited

U.S. PATENT DOCUMENTS

| | | | | |
|---|---|---|---|---|
| 6,215,066 | B1* | 4/2001 | Kelso | H02G 3/14 |
| | | | | 174/66 |
| 6,649,838 | B1* | 11/2003 | Lopez, Sr. | H02G 3/14 |
| | | | | 174/66 |
| 7,351,910 | B1* | 4/2008 | Magisano | H02G 3/125 |
| | | | | 174/58 |
| 7,554,037 | B1* | 6/2009 | Shotey | H02G 3/14 |
| | | | | 174/481 |
| 7,728,226 | B2* | 6/2010 | Drane | H01H 21/085 |
| | | | | 174/66 |
| 9,276,389 | B1* | 3/2016 | Elbaz | H02G 3/14 |

* cited by examiner

ELECTRICAL COVER

CROSS-REFERENCE TO RELATED APPLICATIONS

This application claims the benefit of U.S. Provisional Patent No. 62/331,962 entitled GuardSpark Covers and filed on May 4, 2016, which is specifically incorporated by reference herein for all that it discloses and teaches.

TECHNICAL FIELD

The invention relates generally to the field of commercial and residential electrical construction; and more particularly, to the field of preparing electrical wiring components prior to painting/texturing or otherwise finishing surrounding surfaces; and more particularly still, to electrical covers designed to fit over one or more electrical outlet(s) [[switches, and recessed light fixtures]] to protect said component during painting/texturing/finishing processes.

BACKGROUND

There are many products designed to cover and/or protect electrical outlets (hereinafter, "electrical components") from receiving paint, texture, or other finishing materials (collectively, "finish materials") during finishing projects. This is important as such materials can enter electrical components and cause malfunctions, be unsightly, reduce functionality, or even create electrical wiring hazards. In such situations, removing materials from electrical components can be time consuming and difficult; it is a much better approach to keep such materials from entering the electrical components in the first place. One common partial solution is to tape over the electrical components before commencing finish work. However, this is a laborious and time consuming process that ultimately yields unimpressive results as the gaps between rows or columns of tape allow materials to enter the electrical components. Furthermore, during the taping process, it is easy to accidentally make contact with the interior of the electrical components leading to potential electrical shock hazards. Tape is not reusable and often lets loose or fails when touched, vibrated, or otherwise moved—simple exposure to sunlight can also cause tape to fail. Not to mention the unsightly residue that tape often leaves behind. The prior art has seen the shortcomings of tape and attempted to address them with plastic paint shields. However, most such shields utilize prongs that either project into the outlets or into the electrical boxes. Many modern outlets have safety tabs that defeat insertion of such prongs causing such paint shields to be unusable. Further, depending on the installation of electrical components, there may be no room for insertion prongs to fit into an electrical box to the side of switches or outlets. Again, failure of such paint shields results. Additional problems with prior art paint shields is that they are flat, flimsy and prone to cracking, so they often gap or buckle, leaving spaces through which finish materials can enter. Thicker, more rigid shields fail to account for variations in manufacturing tolerances between electrical components, so may not fit all electrical components. What is needed is an electrical cover that is arched instead of flat so as to provide a better seal once installed, is able to be pressure-fit so that no insertion prongs are necessary, and is easy to quickly add or remove in order to save labor during finishing projects.

SUMMARY

The electrical cover comprises a friction-held electrical cover. Embodiments of the electrical cover described herein provide flexible finish material covers that guard outlets from paint, spackling, and other foreign materials. The frictionally-held finish material covers utilize specifically shaped features on the surfaces, such as negative draft, that contact the electrical components to increase the hold on the electrical device. Some of the shaped features of the frictionally-held covers also help minimize stress in the cover. The electrical covers are shaped with an arched rear surface that assists in minimizing edge warping when the electrical cover is positioned against the wall surface. Features are also molded into the parts to assist and strengthen the cover flatness once installed, and thus protect against the intrusion of finish material behind the cover.

The above summary provides a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some initial concepts in a simplified form as a prelude to the more detailed description that is presented later.

BRIEF DESCRIPTION OF THE DRAWINGS

The aforementioned and other features and objects of the present invention and the manner of attaining them will become more apparent and the invention itself will be best understood by reference to the following descriptions of a preferred embodiment and other embodiments taken in conjunction with the accompanying drawings, wherein.

DETAILED DESCRIPTION

Figure 1:
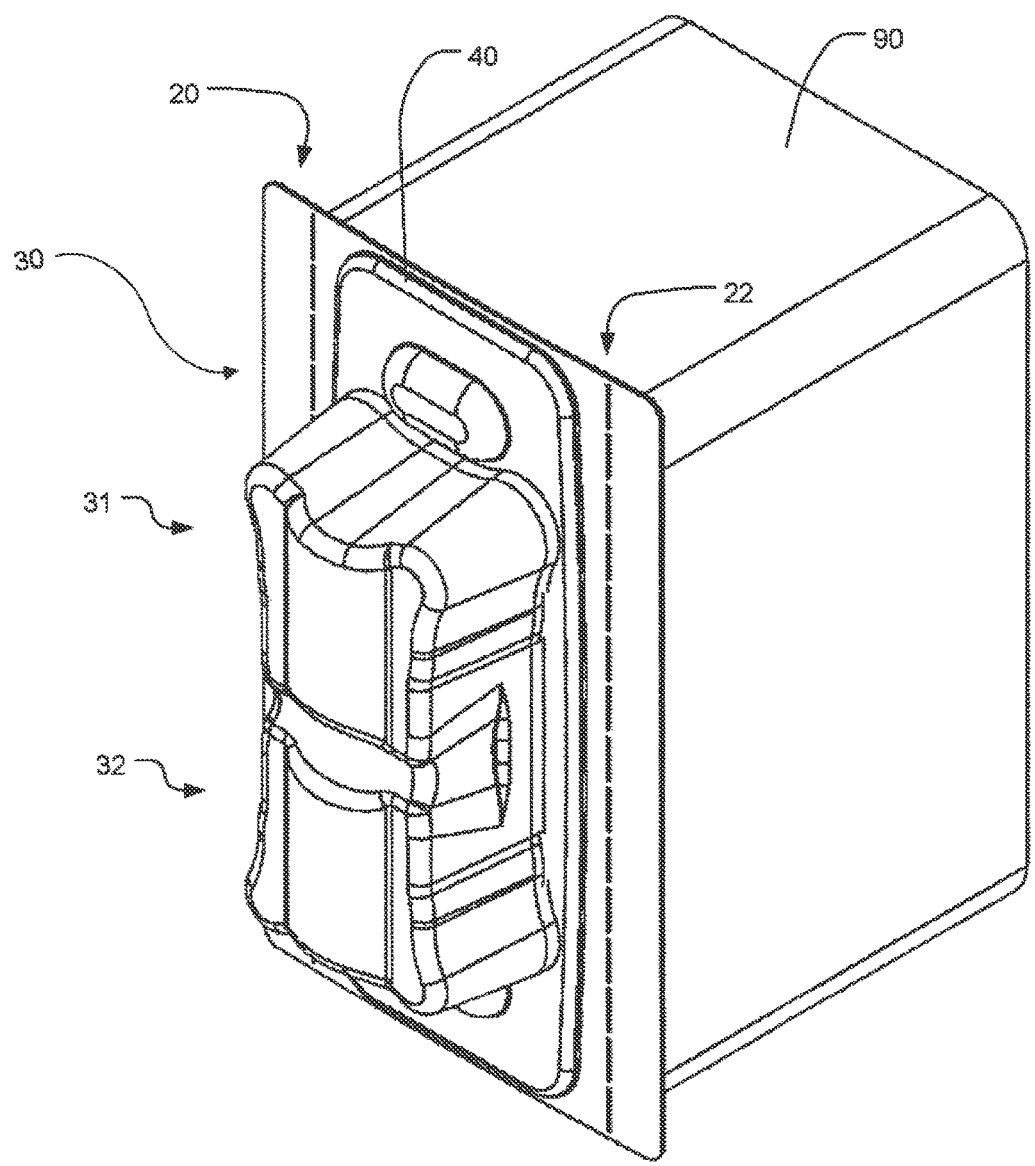
FIG. 1 illustrates a front perspective view of an exemplary embodiment of an electrical cover in place on an outlet and electrical box.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below in the accompanying Figures. The following detailed description provides a review of the drawing Figures in order to provide an understanding of, and an enabling description for, these embodiments. One having ordinary skill in the art will understand that in some cases well-known structures and functions have not been shown or described in detail to avoid unnecessarily obscuring the description of the embodiments. Further, examples described herein are intended to aid in understanding the principles of the embodiments, and are to be construed as being without limitation to such specifically recited examples and conditions. As a result, the inventive concepts are not limited to the specific embodiments or examples.

Referring now to the drawings, FIG. 1 illustrates a front perspective view of an exemplary embodiment of an electrical cover 10 in place on an outlet 92 and electrical box 90. The main body of the electrical cover 10 extends vertically and curves horizontally so as to form an arch when viewed from above (see later FIGs.). The materials comprising the electrical cover in this embodiment can be transparent, other embodiments may utilize translucent and/or opaque components. Running vertically along both sides of the of the main body is a plurality of scored cut-lines 20 and 22, these provide a simple guide for the user to cut away excess materials when using multiple electrical covers 10 on multiple side-by-side outlets. In other embodiments, the scored cut-lines 20 and 22 can be deep enough that a user can simply bend the cover along those lines and snap off the excess rather than requiring cutting.

Note that FIG. 1 illustrates the electrical cover in place on an outlet and mated electrical box 90. As such, the un-installed arch of the rear surface of the electrical cover is difficult to make out, see later FIGs. for more detail of the arch.

Figure 2:
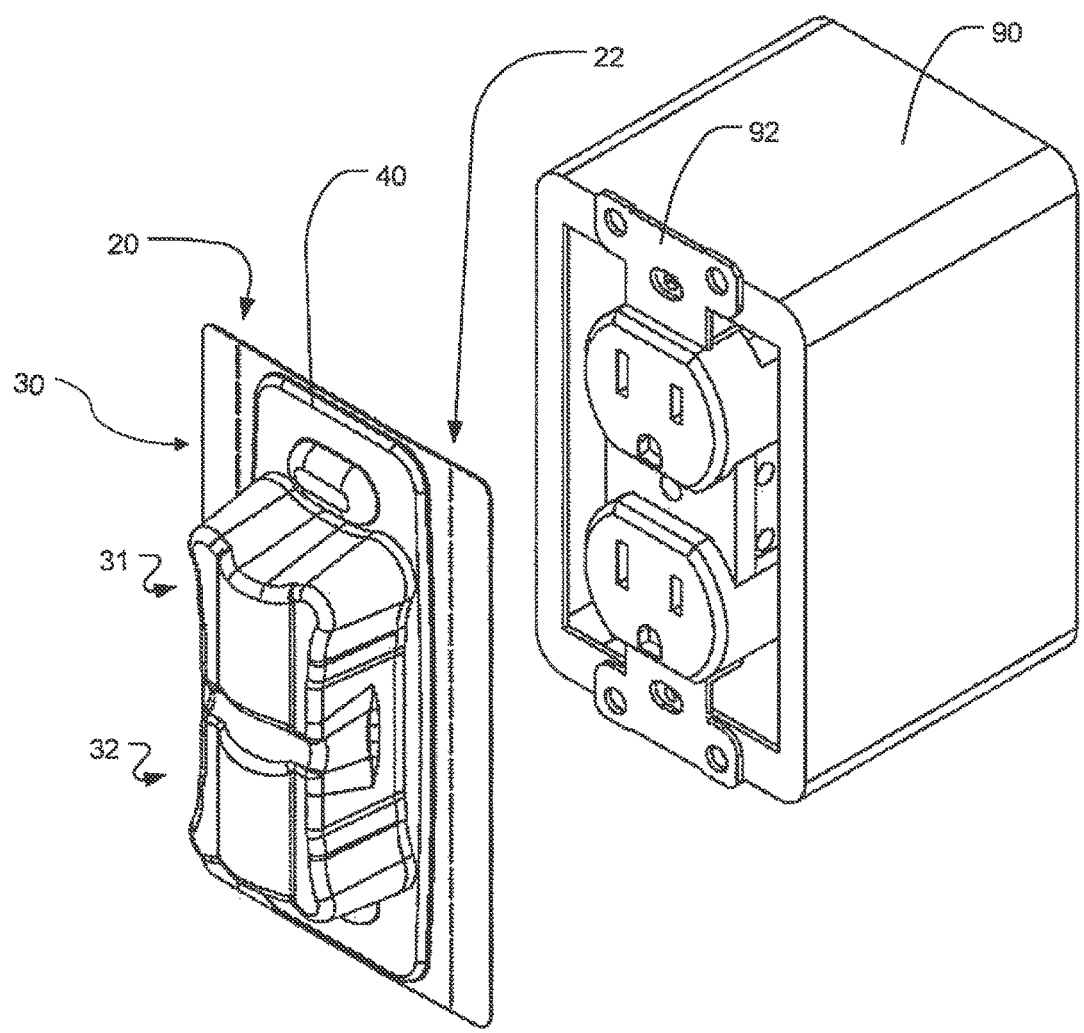
FIG. 2 illustrates a front perspective view of an exemplary embodiment of an electrical cover shown about to be emplaced on an outlet and electrical box.

In the embodiment illustrated in FIG. 1, a raised plateau 40 is shown surrounding the outlet 92 (not visible in FIG. 1, see FIG. 2). The raised plateau 40 provides clearance for outlet bracketry and helps to sustain contact between the rear surface of the cover and the box and/or surrounding surfaces/walls. Extending up from the plateau 40 is the receptacle guard 30, comprising an upper receptacle grasp 31 and a lower receptacle grasp 32. The receptacle grasps 31 and 32 are designed to surround the individual receptacles and pressure-fit over them in order to hold the electrical cover in place. See later FIGs. for additional explanation of the subcomponents that help the receptacle grasps 31 and 32 grip and hold the outlet.

Note that as the electrical cover 10 is pressed onto the outlet, the receptacles grasps 31 and 32 grip the electrical receptacles from the top, sides, and bottom with a friction fit. The arched shape of the back surface of the electrical cover is pressed approximately flat so that no gaps are available through which finish materials can enter either the outlet or the electrical box. The electrical covers protect not only the outlet itself, but associated wiring, wiring connections, and the walling materials (e.g., drywall) that surrounds the perimeter of the outlet. The electrical covers shield the electrical components from paint and/or other surface finishing materials such as plastering or spackling that is sprayed and/or rolled onto a wall surface or surface finishing treatments such as grouting tiles. The electrical covers may be reused, and may be washable or disposable. The electrical covers can be fabricated from a low-cost thermally formed polymer plastic. The covers utilize negatively drafted contact surfaces to improve the overlapping friction holding force while minimizing material stress. A second arched surface formed into the center of the electrical covers improves the holding force as well. Rounded surfaces are designed into the covers to minimize the risk of cracking, make the covers easier to form during fabrication, and improve the covers' holding frictional force as well as the life-cycle for reusability.

FIG. 2 illustrates a front perspective view of an exemplary embodiment of an electrical cover 10 shown about to be emplaced on an outlet 92 and electrical box 94. The same components from FIG. 1 are illustrated and referenced but since the electrical cover 10 is spaced away from the outlet 92, the various relationships can be better seen and understood.

Figure 3:
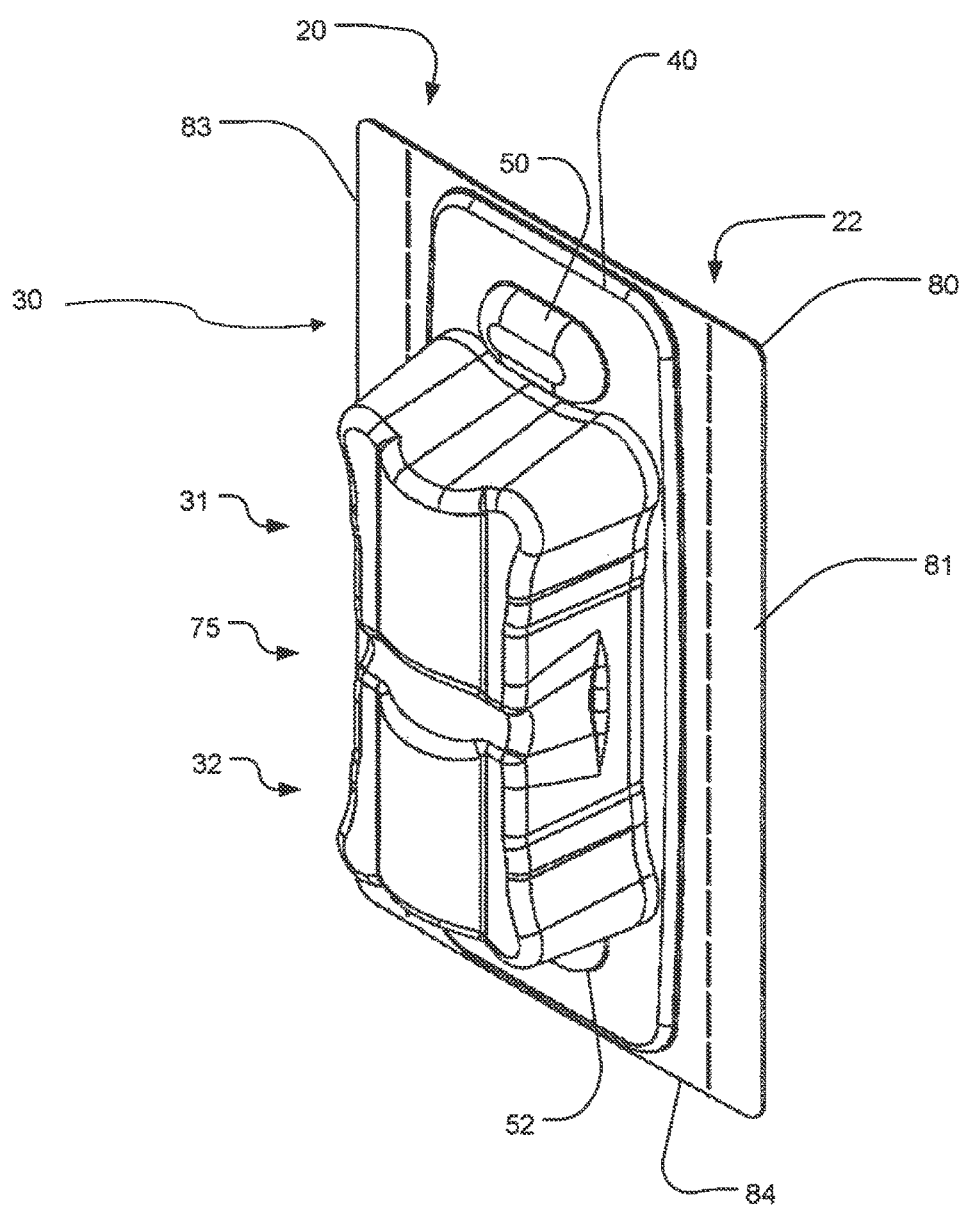
FIG. 3 illustrates a front perspective view of an exemplary embodiment of an electrical cover.

FIG. 3 illustrates a front perspective view of an exemplary embodiment of an electrical cover 10. In this view, the arch that is formed into the rear surface of the electrical cover 10 can be seen in the top rim 80. The arch is more easily discernable here than in FIG. 1 as this electrical cover is not installed. See FIG. 5 for an additional depiction of this feature. The right side rim 81 and left side rim 83 are depicted in this FIG., as is the bottom rim 84. As can be seen in the illustration, the rims are preferably somewhat thin so that they can be flexible and mold to the underlying surfaces once installed in order to minimize any gapping therebetween.

Moving from the top down, the first feature that is encountered on the raised plateau 40 is the fastener clearance 50. This feature allows the cover to clear any screws or other fasteners used to install the outlet 92 in the electrical box 90. A second fastener clearance 52 is present near the bottom edge of the raised plateau 40. Between the two fastener clearances 50 and 52 is the receptacle guard 30, comprising an upper receptacle grasp 31 and a lower receptacle grasp 32. Between the two is a strengthening bridge 75 which strengthens resistance against pinching the plurality of finger holds 74 and 76 and increases the cover holding force to the outlet. The outer front face surfaces of the grasps 31 and 32 can be arched as well (see first grasp arch 72 and second grasp arch 78 in FIG. 3) to strengthen the electrical cover and assist in the grasping functionality.

Figure 4:
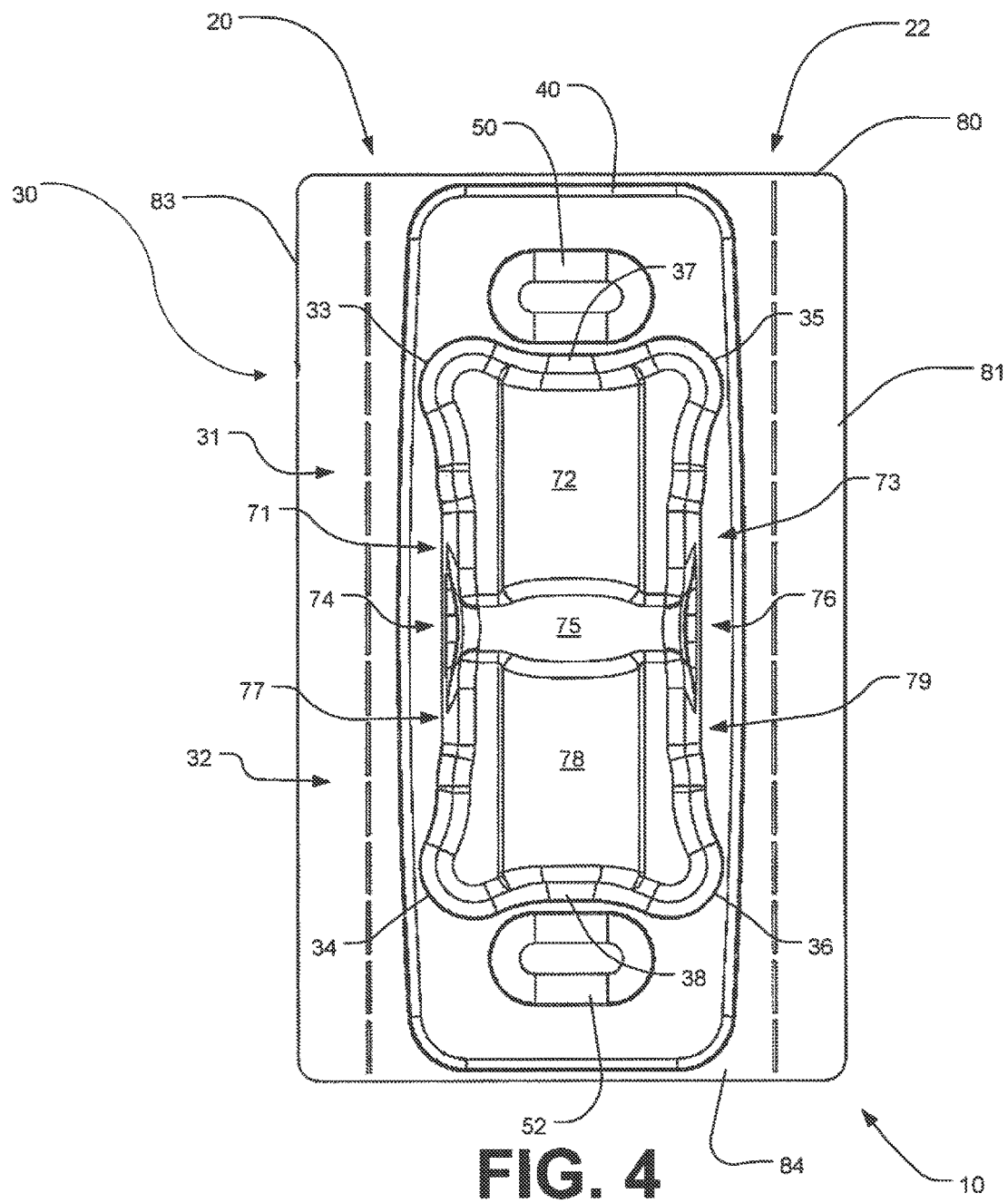
FIG. 4 illustrates a front elevation view of an exemplary embodiment of an electrical cover.

FIG. 4 illustrates a front elevation view of an exemplary embodiment of an electrical cover 10. In addition to all the subcomponents discussed above, FIG. 4 highlights a number of additional components that are instrumental in the grasping functionality that provides the pressure-fit of the electrical cover 10 to the outlet.

The standard outlet is made up of two, vertically-stacked receptacles. The upper receptacle grasp 31 can utilize a top grasp wall 37 to grasp the upper edge of the top receptacle. Similarly, a right side grasp wall 73 grasps the right side of the top receptacle and a left side grasp wall 71 grasps the left side of the top receptacle. These grasp walls 37, 71 and 73 work in combination with each other and with those of the lower receptacle grasp 32 to securely grip and hold the outlet receptacles. The lower receptacle grasp 32 has grasp walls similar to those detailed above: a right side grasp wall 79 grasps the right side of the bottom receptacle, a left side grasp wall 77 grasps the left side of the bottom receptacle, and a bottom grasp wall 38 grasps the bottom edge of the bottom receptacle. The grasp walls 37, 38, 71, 73, 77 and 79 all angle slightly inwards as they extend out from the raised plateau 40 in order to accommodate outlet receptacles of various sizes due to manufacturing tolerances, etc.

Additionally, the contact surfaces of the grasp walls may incorporate a modified surface friction material (such as a laminate material, tape, additional layer of plastic, etc.), coating (such as lacquer, polyurethane, etc.), or roughening (during or after formation). Modifying the surface roughness further enhances the electrical cover's ability to accommodate size variations in the outlet receptacles without introducing too much overlap.

The cover is designed with pressure points that allow the user to engage and disengage the friction surfaces that hold to the electrical device. In FIG. 4, these pressure points comprise the plurality of finger holds 74 and 76. By squeezing at these key points, the user causes the grasp walls to separate and release the electrical cover from the receptacles. The plurality of top spacer corners 33 and 35 and bottom spacer corners 34 and 36 provide flexibility to the grasp walls therebetween and help the finger holds 74 and 76 function properly. As noted above, the cover utilizes surfaces that are negatively drafted relative to other drafted features on the surfaces that contact the electrical device to increase the overlap and help minimize stress in the cover.

Figure 5:
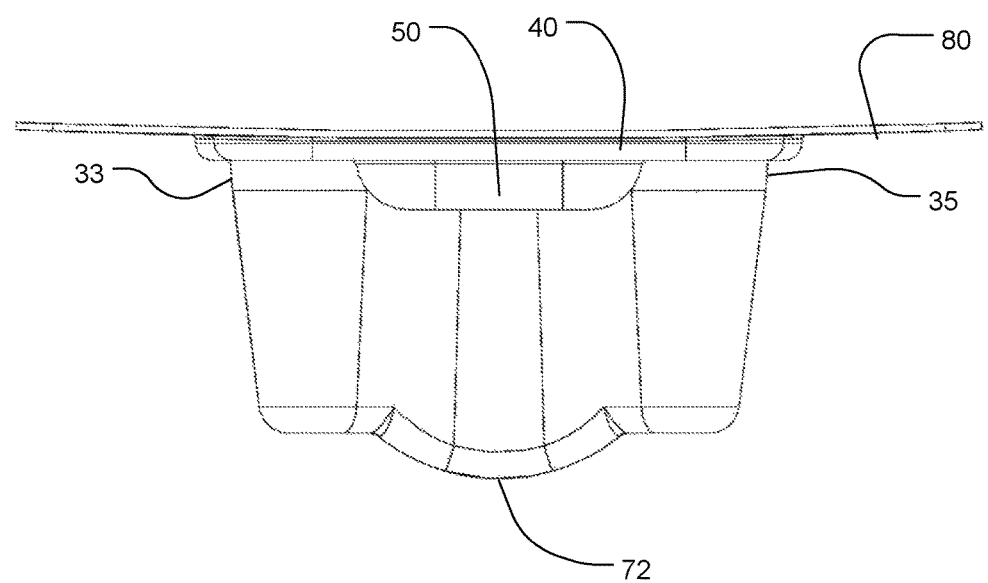
FIG. 5 illustrates a top plan view of an exemplary embodiment of an electrical cover.

FIG. 5 illustrates a top plan view of an exemplary embodiment of an electrical cover 10. Note the accentuated arch shape apparent in the top rim 80. The perimeter of the electrical cover is approximately flattened against the installation surface (wall, outlet box, etc.) once installed and the arch causes constant pressure to be applied to the top, left, right, and bottom rims forcing them against the installation surface and minimizing gaps therebetween.

Figure 6:
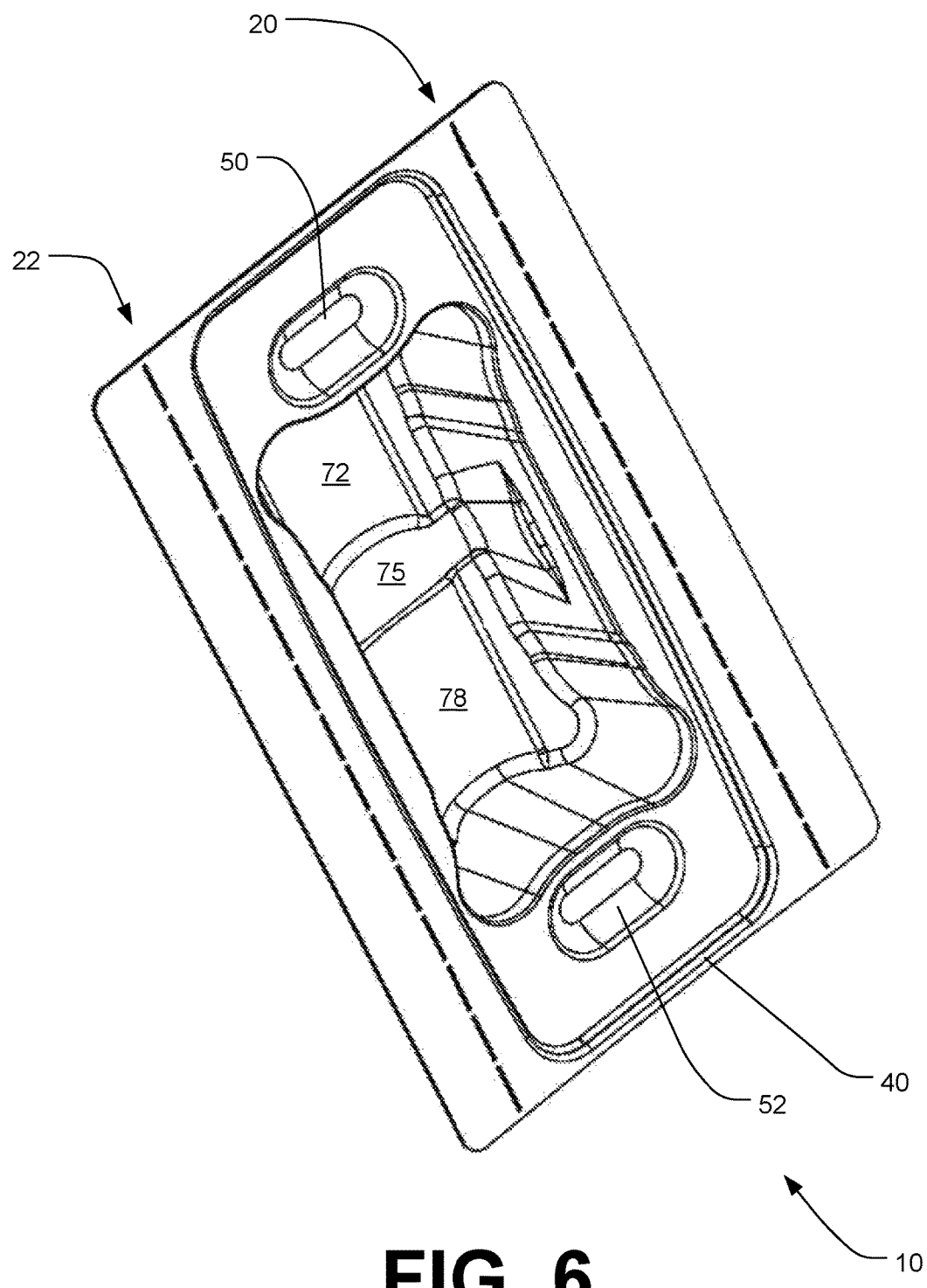
FIG. 6 illustrates a rear perspective view of the inside of an exemplary embodiment of an electrical cover.

FIG. 6 illustrates a rear perspective view of the inside of an exemplary embodiment of an electrical cover 10. Note that components referenced on earlier Figures are referenced here. This view is showing the rear of these components; said view can also be termed as an inside view as the previous views showed the front or external surface of the electrical cover while this view shows the internal surfaces.

While particular embodiments have been described and disclosed in the present application, it is clear that any number of permutations, modifications, or embodiments may be made without departing from the spirit and the scope of this disclosure. Particular terminology used when describing certain features or aspects of the embodiments should not be taken to imply that the terminology is being redefined herein to be restricted to any specific characteristics, features, or aspects with which that terminology is associated. In general, the application should not be construed to be limited to the specific embodiments disclosed in the specification, unless the above Detailed Description section explicitly defines such terms. Accordingly, the actual scope of the inventions encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

The above specification, examples and data provide a description of the structure and use of exemplary implementations of the described systems, articles of manufacture and methods. It is important to note that many implementations can be made without departing from the spirit and scope of the disclosure.

We claim:

1. An outlet cover, comprising:
   an electrical cover extending to a pair of opposed rim sides;
   a raised plateau medially disposed on said electrical cover; and
   a receptacle guard medially disposed on said raised plateau, said receptacle guard includes an upper receptacle grasp and a lower receptacle grasp to receive each electrical receptacle of an electrical outlet, wherein each of said upper receptacle grasp and said lower receptacle grasp include grasp walls configured to grip each said electrical receptacle to hold said outlet cover in place.

2. The outlet cover of claim 1, further comprising a strengthening bridge disposed between said upper and lower receptacle grasp, said strengthening bridge extending between a pair of opposed finger holds disposed on a right side grasp wall and a left side grasp wall, said pair of finger holds upon squeezing release said upper receptacle grasp and said lower receptacle grasp from each said electrical receptacle.

3. The outlet cover of claim 2, further comprising an amount of curvature between said pair of opposed rim sides.

4. The outlet cover of claim 3, further comprising a first fastener clearance and second fastener clearance correspondingly disposed on said raised plateau proximate a top rim and a bottom rim of said electrical cover on said raised plateau.

5. An outlet cover, comprising:
   an electrical cover having an amount of curvature between a pair of opposed rim sides;
   a raised plateau medially disposed on said electrical cover; and
   a receptacle guard medially disposed on said raised plateau, said receptacle guard including an upper receptacle grasp and a lower receptacle grasp configured to receive each electrical receptacle of an outlet.

6. The outlet cover of claim 5, further comprising a scored cut-line disposed inward of each side of said pair of opposed rim sides, said scored cut-lines allow snap-off or cutaway of excess said electrical cover.

7. The outlet cover of claim 5, wherein each of said upper receptacle grasp and said lower receptacle grasp include grasp walls configured to grip each said electrical receptacle to hold said outlet cover in place.

8. The outlet cover of claim 7, further comprising a strengthening bridge disposed between said upper and lower receptacle grasp, said strengthening bridge extending between a pair of opposed finger holds disposed on a right side grasp wall and a left side grasp wall, said pair of finger holds upon squeezing release said upper receptacle grasp and said lower receptacle grasp from each said electrical receptacle.

9. The outlet cover of claim 7, further comprising a first fastener clearance and a second fastener clearance correspondingly disposed on said raised plateau proximate a top rim and a bottom rim of said electrical cover.

10. An outlet cover, comprising:
   an electrical cover extending to a pair of opposed rim sides;
   a raised plateau medially disposed on said electrical cover;
   a receptacle guard medially disposed on said raised plateau, said receptacle guard configured to receive each electrical receptacle of an electrical outlet; and
   a scored cut-line disposed inward of each of said pair of opposed rim sides, said scored cut-lines allow snap-off or cutaway of excess said electrical cover.

11. The outlet cover of claim 10, further comprising an upper receptacle grasp and a lower receptacle grasp, wherein each of said upper receptacle grasp and said lower receptacle grasp include grasp walls configured to grip each said electrical receptacle to hold said outlet cover in place.

12. The outlet cover of claim 11, further comprising a strengthening bridge disposed between said upper and lower receptacle grasp, said strengthening bridge extending between a pair of opposed finger holds disposed on a right side grasp wall and a left side grasp wall, said pair of finger holds upon squeezing release said upper receptacle grasp and said lower receptacle grasp from each said electrical receptacle.

13. The outlet cover of claim 11, further comprising a first fastener clearance and a second fastener clearance disposed on said raised plateau proximate a top rim and a bottom rim of said electrical cover.

14. The outlet cover of claim 10, further comprising an amount of curvature between said pair of opposed rim sides.

* * * * *